United States Patent Office 2,806,032
Patented Sept. 10, 1957

2,806,032

DIPHENOLIC THERAPEUTIC COMPOUNDS

Charles F. Geschickter, Kensington, Md., assignor to The Geschickter Fund for Medical Research, Inc., Washington, D. C., a corporation of New York No Drawing. Application March 7, 1955,
Serial No. 492,775

6 Claims. (Cl. 260—247.5)

The present invention relates to therapeutic compounds useful in the treatment of arthritis.

This application is a continuation-in-part of application Serial No. 406,601, filed January 27, 1954, now abandoned, which was in turn a continuation-in-part of Serial No. 216,277 filed March 17, 1951, now abandoned.

One of the objects of the present invention is to provide novel diphenolic compounds.

Another object is to provide Mannich derivatives of diphenolic compounds.

Another object is to provide salts of di-Mannich, di-phenolic compounds.

Other objects and advantages will be apparent from the following specification and claims.

The general graphic formula of the compounds of the present invention is as follows:

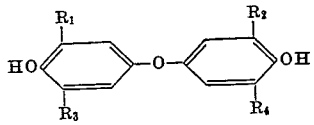

The compounds I have found to be most useful therapeutically are those in which $R_1$ and $R_2$ are halides, mainly chlorine, and $R_3$ and $R_4$ are Mannich groups. The Mannich groups are dialkylaminomethyl group in which each alkyl chain contain 1 to 4 carbon atoms or a cyclic amino methyl group in which the cyclic amine is pyrollidine, morpholine, piperidine, methyl piperazine or isoindole. The diphenols without the Mannich groups may be procured commercially and the Mannich groups are added by reacting the appropriate diphenol, the appropriate amine and formaldehyde in alcohol in a manner known in the art.

The free bases prepared in this manner may be salted with a suitable acid such as hydrochloric acid and these salts are readily soluble in aqueous media.

The following is an example of specific compounds of the present invention.

EXAMPLE 1.—PREPARATION OF DI-MANNICH DERIVATIVES OF 4,4' - OXY - BIS(2 - CHLOROPHENOL)

A. *From N-methyl-piperazine (No. C-36)*

4.07 g. (.015 mole) of the above biphenol was dissolved in 15 ml. of absolute ethyl alcohol, and 5.1 g. (.046 mole) of N-methyl piperazine was added. Using a 100 ml. round bottom flask, the mixture was cooled in an ice bath and 3.75 g. (.04 mole) of 37% aqueous formaldehyde solution was added slowly over a 15-minute period. After standing one hour at room temperature, a return condenser was placed on the flask and its contents refluxed gently for four hours on a steam bath. The reaction mixture was chilled overnight, and the tan product was filtered and washed with 10 ml. of cold methanol, obtaining 4.45 g. of crude crystalline product (60% yield). The compound was purified by recrystallizing it from a benzene-petroleum ether mixture which produced nearly white crystals, M. P. 198–200° C.

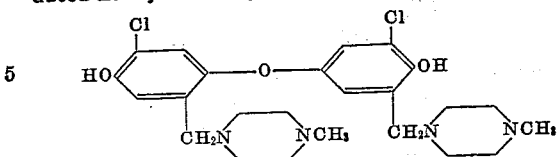

This and other similar derivatives salt easily with acids to give solutions with pH values ranging from 4.5 to 6.0. The acute toxicity value on the N-methylpiperazine derivative is as follows: $LD_{50}=150$ mg./kg.

B. *From other amines*

Other di-Mannich derivatives prepared in a similar way from 4,4'-oxy-bis(2-chlorophenol) include the following: (1) from dimethylamine, M. P. 130–1° C.; (2) from morpholine, M. P. 160–1° C.; (3) from pyrrolidine, M. P. 158–9.5° C.; (4) from piperidine, M. P. 166.5° C.; (5) a mixed Mannich derivative from morpholine and piperidine, M. P. 168–170° C.; and (6) a mixed Mannich derivative from morpholine and pyrrolidine, M. P. 142–3° C.

The compounds of the present invention may be administered either orally or by injection. Oral doses of 100 mg. given three times daily or injections of 100 mg. given once daily relieve pain in arthritis. The compounds are retained in the body for relatively long periods so that the relief is lasting. These compounds also have other therapeutic properties.

From the foregoing it is apparent that I am able to attain the objects of my invention and provide new compounds which are useful in the treatment of arthritis.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A composition of matter having the formula

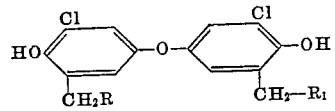

in which R and $R_1$ are selected from the group consisting of dimethylamine, morpholine, pyrrolidine, piperidine and methyl piperazine.

2. The compound having the formula

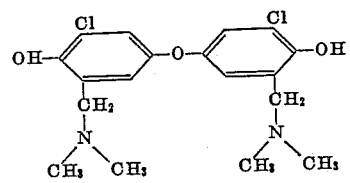

3. The compound having the formula

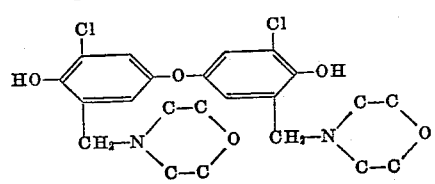

4. The compound having the formula
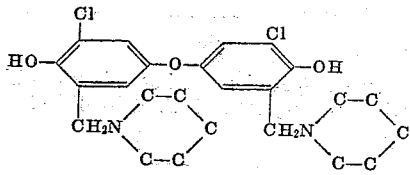
5. The compound having the formula
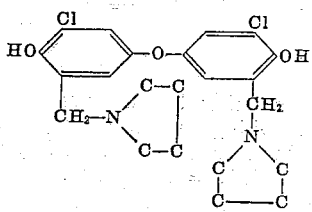
6. The compound having the formula
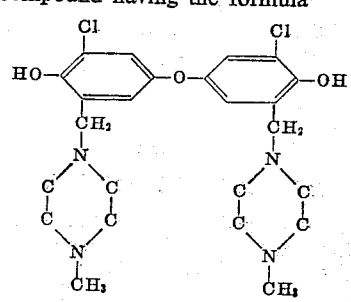
No references cited.